3,258,070
REMOVAL OF IRON COMPOUNDS FROM WATER
Robert E. Reusser, Bartlesville, Okla., assignor to Phillips Petroleum Company, a corporation of Delaware
No Drawing. Filed Oct. 28, 1963, Ser. No. 319,592
8 Claims. (Cl. 166—7)

This invention relates to the removal of iron compounds from water. In one aspect this invention relates to a method for secondary recovery of oil from oil-bearing formations.

The presence of iron compounds in water creates problems in various types of operations. For example, one operation which has come into widespread use by the oil industry in this country is the use of water to flood or pressure an oil-bearing formation in the secondary recovery of oil. Such an operation is used after the original gas pressure associated with the oil has become depleted and no natural drive is present for displacing or moving the oil from the formation. Thus, in a water flooding operation water is injected into the oil-bearing formation to drive or displace the oil through the oil-bearing formation and toward a producing well. Since the flow or displacement of oil through the formation toward the producing well or wells is a function of the drive pressure, the porosity and permeability of the formation, and the viscosity of the oil, any material tending to plug said formation is very detrimental to the operation. It has been found that precipitation of iron, particularly as the sulfide, occurs readily in many wells in water flooding operations, thus severely limiting or restricting displacement of the oil toward the producing well.

The water used in water flooding operations can be either surface water or underground water. In a water flooding operation the liquid produced from the producing well is a mixture of oil and water. In practice, the liquid from the well is separated to give an oil fraction and a water fraction which is then returned (with make-up water if necessary) to the injection well as injection water. Even though the water removed from a producing well may appear to be clear and colorless, the presence of ferrous ions and sulfide ions will lead to the formation of a precipitate after a relatively short period of time. For example, with one particular well a sample of the water removed therefrom becomes gray after standing about 30 minutes, and after standing overnight a precipitate of black ferrous sulfide will be found on the bottom of the container. If such water is injected into a formation, the ferrous sulfide precipitate will plug the formation.

Another operation which is severely hampered by the presence of iron compounds is the softening of water by ion-exchange means. Ion-exchange softening of water is in widespread use, both for industrial operations and for homes. Most of these ion-exchange resins function by exchanging an alkali metal ion such as sodium for a hard ion such as calcium or magnesium. Thus, periodical regeneration of the resins with brine is required. If the water being treated contains substantial quantities of dissolved iron, this iron competes with the hard ions present and greatly decreases the efficiency of the operation. Furthermore, some resins are particularly difficult to regenerate if substantial quantities of iron have been picked up by the resin.

Dissolved iron compounds present in water are not always present in the ferrous state. Likewise, sulfide ions are not always present. The wide variety of iron compounds or salts which can be present in water complicates the problem of removing the dissolved iron from the water.

I have discovered that dissolved iron can be removed from the water by converting said iron compounds to ferrous sulfide, if said iron is present as some other compound or salt, and then extracting the resulting slurry-solution of ferrous sulfide with a solution of a quaternary ammonium compound in a solvent which is not completely miscible with water. Of course, if the iron is already present as ferrous ion and the sulfide ion is also present, it is not necessary to convert the iron to ferrous sulfide.

Thus, broadly speaking, the present invention resides in removing dissolved iron from water by converting said iron to ferrous sulfide, if said iron is not already present as ferrous sulfide, and then extracting the resulting aqueous slurry-solution with a solution of a quaternary ammonium compound in an inert organic solvent which is not completely miscible with water.

An object of this invention is to provide a process for removing iron compounds from water. Another object of this invention is to provide an improved method of water flooding in the secondary recovery of oil. Still another object of this invention is to provide a method for preventing the precipitation of iron sulfide in oil-producing formations in water flooding operations. Other aspects, objects, and advantages of the invention will be apparent to those skilled in the art in view of this disclosure.

Thus, according to the invention, there is provided a process for removing iron compounds from water, which process comprises: converting said iron compounds in said water to ferrous sulfide; contacting the resulting mixture of ferrous sulfide and water with an extractant comprising a solution of a quaternary ammonium compound in an inert organic solvent whereby said ferrous sulfide is extracted into said extractant; and separating said extractant from said water.

Further according to the invention, there is provided a process for treating water containing ferrous ions and sulfide ions, which process comprises: contacting said water with a solution, in an inert organic solvent which is not completely miscible with water, of a compound having the formula $$(R_4N)_nX$$

wherein: each R is selected from the group consisting of hydrocarbon radicals containing from 1 to 24 carbon atoms, the total number of carbon atoms in said R groups being within the range of from 4 to 38; X is an anion selected from the group consisting of chloride, bromide, iodide, fluoride, sulfate, phosphate, acetate, and hydroxide; and $n$ is the valence of X; whereby ferrous sulfide is extracted into said solution; and separating said organic solvent from said water.

The process of this invention is carried out by converting the aqueous solution of iron salts or compounds to a slurry-solution of iron sulfide. This can be accomplished by treating the solution with an alkali metal sulfide such as sodium sulfide or by bubbling $H_2S$ through the solution. It is to be recognized that if the iron is already present as the sulfide, such as is the case in many water flood operations, this first step can be omitted. It should also be pointed out that the water can be either natural water, or water which has been carbonated. Carbonated water is widely used in water flood operations, as the carbonation improves the efficiency of the secondary recovery operation. It is generally preferred that the invention be applied to water having a pH of from 5 to 10, preferably about 7 to about 9, and it is also preferred that highly acid waters be avoided. The treatment to convert the iron salts to sulfide form and the subsequent extraction of the slurry-solution of iron sulfide with a solution of a quaternary ammonium compound will generally be carried out at a temperature within the range from about 20 to about 60° C. However, temperatures outside said range can be employed. The process of the invention can be carried out at any suitable pressure, to maintain liquid phase conditions, ranging from atmospheric to superatmospheric. There usually is no advantage in carrying out the treatment at superatmospheric pressures except for convenience in operation as when the process of the invention is being carried out in connection with other processes operated under superatmospheric pressures.

Hydrogen sulfide or any suitable water soluble sulfide which will not introduce an objectionable metal ion into the water can be used in the practice of the invention for converting the iron salts or compounds to the sulfide. The preferred sulfides are the ammonium and the alkali metal sulfides, including polysulfides. As used herein, the term "alkali metal" refers to sodium, potassium, lithium, rubidium, and cesium. Because of availability and price, sodium sulfide is a presently preferred sulfide for use in the practice of the invention. Sodium sulfide is available commercially in several different forms such as the monosulfide $Na_2S$, and various polysulfides, e.g., sodium tetrasulfide $Na_2S_4$, etc. Said sulfides are also available in hydrated forms. The sodium sulfide nonahydrate $Na_2S \cdot 9H_2O$ is a presently most preferred sulfide. The above-described sulfides are used in amounts which are at least stoichiometric with respect to the amount of iron present in the water being treated. It is preferred to use an amount of sulfide which is at least 2 or 3 times stoichiometric so as to insure more complete conversion of the iron to ferrous sulfide.

The quaternary ammonium compounds used in the practice of the invention are organic compounds which can be represented by the general formula

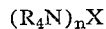

in which four carbon atoms are directly linked to the nitrogen atom and wherein the R groups can be the same and different organic radicals. The anion X can be inorganic or organic and can be, for example, chloride, iodide, bromide, fluoride, sulfate, phosphate, acetate or hydroxide and $n$ is the valence of X.

The R groups in the above formula can be any hydrocarbon radical having from 1 to 24 carbon atoms, and the total number of carbon atoms in the compound can vary from 4 to 38 carbon atoms. Said hydrocarbon radical can be selected from the group consisting of alkyl, alkenyl, cycloalkyl, cycloalkenyl, and aryl radicals, and combinations thereof such as alkaryl, aralkyl, aralkenyl, alkylcycloalkyl, cycloalkylalkenyl, arylcycloalkyl, cycloalkenylaryl, and the like. Commonly, the quaternary ammonium salt has two or more alkyl radicals. The organic radical can be paraffinic, olefinic, diolefinic, acetylenic, or aromatic. It is preferred that at least one of the R groups is an alkyl or alkenyl radical containing at least 8 carbon atoms. Quaternary ammonium compounds preferred in the practice of this invention are those of the above general formula where one or two of the R radicals are long chain alkyl or alkenyl substituents, such as octyl, lauryl, myristyl, palmityl, oleyl, linoleyl, and linolenyl, and the like (such as are obtained by the conversion of ammonium salts of fatty acids to nitriles, followed by hydrogenation and alkylation), with the other three or two R radicals being methyl radicals, and wherein X is a monovalent anion such as chloride.

Examples of the above quaternary ammonium compounds which can be used in the practice of the invention include, among others, the following: dioctyl dimethylammonium chloride, didodecyl dimethylammonium chloride, dodecyl trimethylammonium chloride, dihexadecyl dimethylammonium hydroxide, hexadecyl trimethylammonium acetate, dioctadecyl dimethylammonium phosphate, octadecyl trimethylammonium sulfate, dioctadecenyl dimethylammonium chloride, dioctadecadienyl dimethylammonium chloride, hexadecyl octadecyl dimethylammonium chloride, octadecynyl trimethylammonium bromide, hexadecynyl trimethylammonium iodide, octyl trimethylammonium fluoride, cetyl trimethylammonium bromide, cetyl benzyl dimethylammonium chloride, octadecyl benzyl dimethylammonium chloride, octadecyl ethyl dimethylammonium bromide, dioctyl diethylammonium iodide, tetracosyl trimethylammonium chloride, didodecyl di-n-propyl ammonium sulfate, dicyclohexyl di-(2-methylpentyl)ammonium phosphate, 4-cyclohexenyl trivinylammonium acetate, diethyl diphenylammonium hydroxide, 2,4,6-trimethylbenzyl tri-(2-hexenyl)ammonium chloride, propargyl tri-(n-octyl)ammonium chloride and di-(2-phenylpropyl)dibenzylammonium chloride. The chlorides and hydroxides are preferred. Alkyl trimethylammonium chlorides and dialkyl dimethylammonium chlorides are sold under the trademark "Arquad." Another group of commercially available quaternary ammonium compounds, produced from coconut oil and tallow, are sold under the trademark "Aliquat."

Mixtures of quaternary ammonium compounds within the scope of the above general formula are also useful in the practice of this invention. Some of these mixtures are commercially available and represent crude or partly purified products and mixtures of two or more products. The following tabulation illustrates such products which are designated in terms of the materials from which derived, these products being quaternary ammonium salts dissolved in isopropyl alcohol.

TABLE I

| Product | Description | Quaternary ammonium compound, percent |
|---|---|---|
| Aliquat 5 | Myristyl trimethyl ammonium chloride | 48-52 |
| Aliquat 7 | Stearyl trimethyl ammonium chloride | 48-52 |
| Aliquat 11 | Oleyl trimethyl ammonium chloride | 48-52 |
| Aliquat 15 | Oleyl-linoleyl trimethyl ammonium chloride. | 48-52 |
| Aliquat 21 | Coconut trimethyl ammonium chloride | 48-52 |
| Aliquat 26 | Monotallow trimethyl ammonium chloride. | 48-52 |
| Aliquat 204 | Dilauryl dimethyl ammonium chloride | 73-77 |
| Aliquat 205 | Dimyristyl dimethyl ammonium chloride | 73-77 |
| Aliquat 206 | Dipalmityl dimethyl ammonium chloride. | 73-77 |
| Aliquat 207 | Distearyl dimethyl ammonium chloride | 73-77 |
| Aliquat 215 | Di(oleyl-linoleyl) dimethyl ammonium chloride. | 73-77 |
| Aliquat 221 | Dicoconut dimethyl ammonium chloride | 73-77 |
| Aliquat H226 | Dihydrogenated tallow dimethyl ammonium chloride. | 73-77 |
| Aliquat 336 | Tricaprylyl monomethyl ammonium chloride. | 73-77 |
| Aliquat 400 | 1:1 mixture Aliquats 26 and 221 | 48-52 |
| Arquad S | Soya-trimethyl ammonium chloride | 31-35 |
| Arquad S-2C | Mixture of Soya trimethyl ammonium chloride and di-coconut dimethyl ammonium chloride. | 48-52 |
| Arquad 2C | Di-coconut dimethyl ammonium chloride. | 73-77 |
| Arquad 2HT | Di-hydrogenated tallow di-methyl ammonium chloride. | 73-77 |
| Arquad T | Tallow-trimethyl ammonium chloride | 48-52 |
| Arquad 12 | Lauryl trimethyl ammonium chloride | 48-52 |
| Arquad 16 | Palmityl trimethyl ammonium chloride | 48-52 |
| Arquad 18 | Stearyl trimethyl ammonium chloride | 48-52 |
| Arquad C | Coconut trimethyl ammonium chloride | 48-52 |

The "Aliquat" compounds listed above are produced from coconut oil and tallow. The alkyl groups in the salts correspond to the acids in these oils. Coconut oil contains 8.0 percent caprylic, 7.0 percent capric, 48.0 percent lauric, 17.5 percent myristic, 8.2 percent palmitic, 2.0 percent stearic, 6.0 percent oleic and 2.5 percent linoleic acid. Tallow contains 2.0 percent myristic, 32.5 percent palmitic, 14.5 percent stearic, 48.3 percent oleic and 2.7 percent linoleic acid.

In the practice of the invention the quaternary ammonium compounds are dissolved in an inert organic solvent which is not completely miscible with water. Any organic solvent which is inert under the conditions of use, i.e., does not react chemically with the dissolved iron compounds present in the water, and which is not completely miscible with water is a suitable solvent for use in the practice of the invention. Solutions containing from 0.5 to about 10 percent by weight of the quaternary ammonium compound are generally desirable for convenience in handling. However, solutions having concentrations outside said range can also be used. Suitable solvents include one or more of the following: various hydrocarbon solvents such as kerosene, diesel fuel, heptane, octane, benzene, toluene, xylene; halogenated hydrocarbons such as carbon tetrachloride, chloroform, 1,1,2,2-tetrachlorethane, and 1,2-dichloro-1,2-difluoroethane; and ketones such as methyl ethyl ketone, and diethyl ketone.

In the practice of the invention, the solution of the quaternary ammonium compound is used to extract the iron containing water, which should have a pH of at least 5 and preferably 7 or higher. If necessary, the pH can be adjusted by adding sufficient alkaline material such as sodium hydroxide to provide the desired pH. When using ammonium or one of the alkali metal sulfides to convert the iron compounds to sulfide, a dual effect is usually obtained; the pH will be increased to the desired range for the extraction step and the iron is converted to ferrous sulfide. When hydrogen sulfide is used to convert the iron compounds, it may be necessary with some waters to also add sodium hydroxide to adjust the pH prior to the extraction step.

The extraction can be effected in batch or continuous operation using procedures which are well known in the art. For example, batch operations can be effected in open or closed vessels using from 0.1 to 10 volumes of the organic phase for each volume of the aqueous phase. The two phases are mixed and then separated. Separation of the phases can be hastened by centrifuging, but gravity separation is effective.

The separated iron-rich organic solvent phase can be stripped to remove the extracted iron. Any of several known stripping techniques can be employed for this purpose. For example, the iron-rich organic solvent phase can be passed to stripping equipment such as a plurality of similar mixer-settlers wherein the organic phase is contacted with a suitable stripping agent. For example, the stripping agent employed can be an aqueous solution of hydrochloric acid and sodium chloride, this treatment extracting the iron compounds into the aqueous stripping agent and regenerating the quaternary ammonium compound. The acid solution, containing the extracted iron compounds, is separated from the depleted organic phase, the latter being recycled to the extraction operation. These stripping procedures are conventional and need not be set forth in detail herein.

The following examples will serve to further illustrate the invention.

*Example I*

Water was carbonated and to this carbonated water there was added sufficient $FeSO_4$ to form a solution containing 20 p.p.m. iron. Five volumes of this iron solution was extracted with one volume of a kerosene solution of Aliquat 336 containing 85 weight percent kerosene, 10 weight percent Aliquat 336 and 5 weight percent decyl alcohol. The decyl alcohol was present to insure rapid phase separation. The extraction was carried out by mixing the described amounts of the separate phases, shaking vigorously and separating phases. The aqueous phase, after solvent extraction, analyzed 19 p.p.m. iron, thus showing that the quaternary compound does not extract the iron when it is present as $FeSO_4$.

*Example II*

A sample of the original aqueous iron solution from Example I was then converted to iron sulfide slurry-solution by mixing 1 ml. of $Na_2S$ solution which contained 0.108 gram $Na_2S$ per ml. with 20 ml. of said iron solution at room temperature. The resulting slurry-solution was then filtered without solvent extraction, and analysis of the filtrate showed it to contain 20 p.p.m. iron. This run shows that conversion to the sulfide followed by filtration is not effective for iron removal.

*Example III*

In another run, 50 ml. of the original iron solution from Example I was treated in the same manner as in Example II with 0.3 ml. of the same $Na_2S$ solution used in Example II, after which the resulting slurry-solution was extracted with 1 volume of the kerosene-Aliquat 336 solution of Example I per 5 volumes of the slurry-solution of iron sulfide. After extraction as described above, the aqueous phase analyzed less than 2 p.p.m. iron.

*Example IV*

In another run, 80 ml. of the original $FeSO_4$ solution from Example I was treated in the same manner as in Example II with 1 ml. of the same $Na_2S$ solution used in Example II, after which the resulting mixture was extracted with 1 volume of the kerosene-Aliquat 336 solution of Example I per 5 volumes of the aqueous slurry-solution of iron sulfide. Again, the aqueous phase after extraction analyzed less than 2 p.p.m. iron.

The above Examples III and IV show that the quaternary ammonium compounds will effectively extract iron compounds from water after said iron compounds have been converted to ferrous sulfide.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. A process for removing iron compounds from water, which process comprises: converting said iron compounds in said water to ferrous sulfide; contacting the resulting mixture of ferrous sulfide and water with an extractant comprising a solution of a quaternary ammonium compound in an inert organic solvent whereby said ferrous sulfide is extracted into said extractant; and separating said extractant from said water.

2. A process for removing iron compounds from water, which process comprises: converting said iron compounds to ferrous sulfide; contacting the resulting aqueous mixture of ferrous sulfide and water with an inert organic solvent which is not completely miscible with water, said solvent having dissolved therein a compound having the formula $$(R_4N)_nX$$

wherein: each R is selected from the group consisting of hydrocarbon radicals containing from 1 to 24 carbon atoms, the total number of carbon atoms in said R groups being within the range of from 4 to 38; X is an anion selected from the group consisting of chloride, bromide, iodide, fluoride, sulfate, phosphate, acetate, and hydroxide; and $n$ is the valence of X; and separating said solvent from said water, said solvent containing iron compounds extracted from said water.

3. The process of claim 2 wherein said organic solvent contains from 0.5 to 10 weight percent of said quaternary ammonium compound dissolved therein, and said water is contacted with from 0.1 to 10 volumes of said solvent per volume of said water.

4. A process for removing dissolved iron compounds from water, which process comprises: converting said iron compounds in said water to ferrous sulfide to form an aqueous slurry-solution of ferrous sulfide; adding to said aqueous slurry-solution a solution, in an inert organic solvent which is not completely miscible with water, of a compound having the formula $$(R_4N)_nX$$

wherein: each R is selected from the group consisting of hydrocarbon radicals containing from 1 to 24 carbon atoms, the total number of carbon atoms in said R groups being within the range of from 4 to 38; X is an anion selected from the group consisting of chloride, bromide, iodide, fluoride, sulfate, phosphate, acetate, and hydroxide; and *n* is the valence of X; thoroughly mixing the resulting mixture; and separating the organic solvent phase from the aqueous phase, said solvent phase containing iron compounds which have been extracted from said water.

5. A process for removing dissolved iron compounds from water, which process comprises: adding a sulfide selected from the group consisting of the ammonium sulfides, the alkali metal sulfides, and $H_2S$ to said water to convert said iron compounds to ferrous sulfide; mixing said ferrous sulfide containing water with a solution, in an inert organic solvent which is not completely miscible with water, of a compound having the formula $$(R_4N)_nX$$

wherein: each R is selected from the group consisting of hydrocarbon radicals containing from 1 to 24 carbon atoms, the total number of carbon atoms in said R groups being within the range of from 4 to 38; X is an anion selected from the group consisting of chloride, bromide, iodide, fluoride, sulfate, phosphate, acetate, and hydroxide; and *n* is the valence of X; to form an organic solvent extract phase and an aqueous phase; and separating said organic phase and said aqueous phase, said organic phase containing iron compounds which have been extracted from said water.

6. A process for treating water containing ferrous ions and sulfide ions, which process comprises: contacting said water with a solution, in an inert organic solvent which is not completely miscible with water, of a compound having the formula $$(R_4N)_nX$$

wherein: each R is selected from the group consisting of hydrocarbon radicals containing from 1 to 24 carbon atoms, the total number of carbon atoms in said R groups being within the range of from 4 to 38; X is an anion selected from the group consisting of chloride, bromide, iodide, fluoride, sulfate, phosphate, acetate, and hydroxide; and *n* is the valence of X; whereby ferrous sulfide is extracted into said solution; and separating said organic solvent from said water.

7. In a method for the secondary recovery of oil from an oil-bearing formation by water flooding of said formation, which method comprises separation of oil and water produced from an oil-bearing formation, and injection of said water into said formation, and wherein said water contains ferrous ions and sulfide ions, the improvement which comprises: prior to injection of said water, contacting said water with a solution, in an inert organic solvent whch is not completely miscible with water, of a compound having the formula $$(R_4N)_nX$$

wherein: each R is selected from the group consisting of hydrocarbon radicals containing from 1 to 24 carbon atoms, the total number of carbon atoms in said R groups being within the range of from 4 to 38; X is an anion selected from the group consisting of chloride, bromide, iodide, fluoride, sulfate, phosphate, acetate, and hydroxide; and *n* is the valence of X; whereby ferrous sulfide is extracted into said solution; and separating said organic solvent from said water.

8. In a method for the secondary recovery of oil from an oil-bearing formation by water flooding of said formation, which method comprises separation of oil and water produced from an oil-bearing formation, and injection of said water into said formation, and wherein said water contains dissolved iron compounds, the improvement which comprises: prior to injection of said water, adding a sulfide selected from the group consisting of the ammonium sulfides, the alkali metal sulfides, and $H_2S$ to said water to convert said iron compounds to ferrous sulfide; mixing said ferrous sulfide containing water with a solution, in an inert organic solvent which is not completely miscible wth water, of a compound having the formula $$(R_4N)_nX$$

wherein: each R is selected from the group consisting of hydrocarbon radicals containing from 1 to 24 carbon atoms, the total number of carbon atoms in said R groups being within the range of from 4 to 38; X is an anion selected from the group consisting of chloride, bromide, iodide, fluoride, sulfate, phosphate, acetate, and hydroxide; and *n* is the valence of X; to form an organic solvent extract phase and an aqueous phase; and separating said organic phase and said aqueous phase, said organic phase containing iron compounds which have been extracted from said water.

References Cited by the Examiner

UNITED STATES PATENTS

| | | | |
|---|---|---|---|
| 2,670,335 | 2/1954 | D'Alelio | 210—37 X |
| 2,863,780 | 12/1958 | Bail | 23—154 |

OTHER REFERENCES

Shubert et al.: "Ion Exchange Technology," page 249 relied upon, copyright 1956, by Academic Press, Inc., publishers, New York, N.Y.

MORRIS O. WOLK, *Primary Examiner.*

E. G. WHITBY, *Assistant Examiner.*